(No Model.)
H. H. KELLEY.
COMBINED SPEED INDICATOR AND CYCLOMETER.
No. 583,260. Patented May 25, 1897.
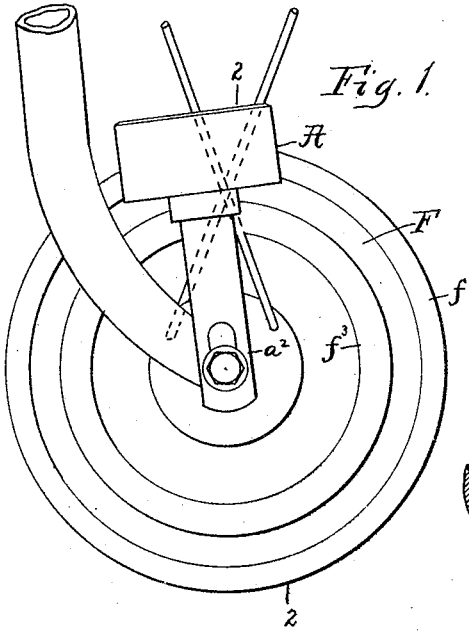
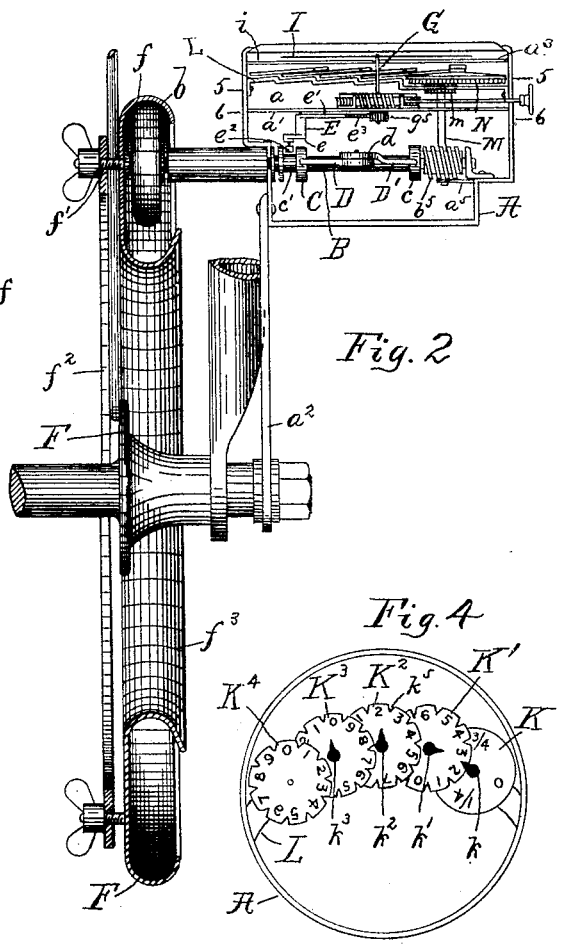
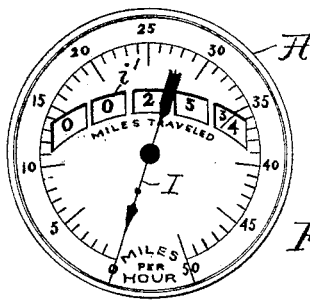
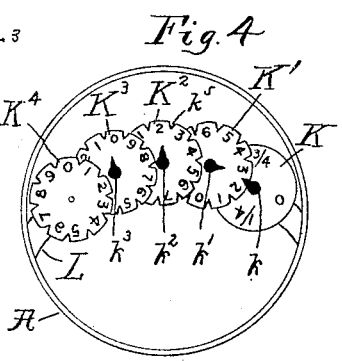
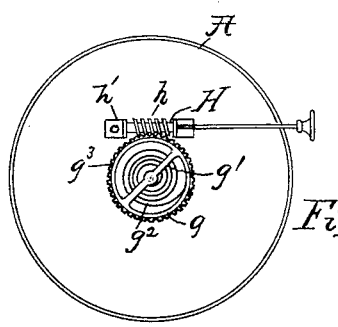
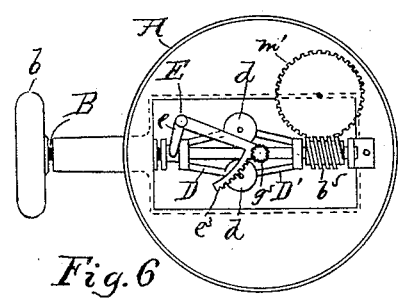
Witnesses.
F. Griswold
W. C. Sterling
Inventor.
Harry H. Kelley
By E. L. Thurston
his atty

UNITED STATES PATENT OFFICE.

HARRY H. KELLEY, OF ELYRIA, OHIO, ASSIGNOR OF ONE-THIRD TO HERBERT S. FOLLENSBEE, OF SAME PLACE.

COMBINED SPEED-INDICATOR AND CYCLOMETER.

SPECIFICATION forming part of Letters Patent No. 583,260, dated May 25, 1897.

Application filed June 3, 1895. Serial No. 551,469. (No model.)

*To all whom it may concern:*

Be it known that I, HARRY H. KELLEY, a citizen of the United States, residing at Elyria, in the county of Lorain and State of Ohio, have invented certain new and useful Improvements in a Combined Speed-Indicator and Cyclometer; and I do hereby declare the following to be a full, clear, and exact description of the invention, such as will enable others skilled in the art to which it appertains to make and use the same.

The object of my invention is to provide a novel device, adapted especially for use on bicycles and other vehicles, which will show plainly both the rate at which the vehicle is traveling at any time and the number of miles it has traveled. In other words, the device in its entirety is a combined speed-indicator and cyclometer.

My invention relates to the speed-indicating mechanism, the cyclometer mechanism, and in the combination of said mechanisms with a single shaft taking motion from the vehicle-wheel and operating both mechanisms, all of which will be hereinafter described, and pointed out definitely in the claims.

In the drawings, Figure 1 is a side elevation of my device applied to a bicycle. Fig. 2 is a central sectional view on line 2 2 of Fig. 1. Fig. 3 is a plan view of the device. Fig. 4 is a plan view of the device with the top plate or dial removed. Fig. 5 is a horizontal sectional view on line 5 5 of Fig. 2, and Fig. 6 is a horizontal section on line 6 6 of Fig. 2.

The mechanism is inclosed and supported by a suitable casing A, across which extends the horizontal partition or bar $a'$. A leg $a^2$ is secured to the casing and serves as the means for connecting the device to the front fork of a bicycle or some fixed part of a vehicle of any kind. The driving-shaft extends horizontally through the casing, being journaled in suitable bearings in the sides thereof. The shaft projects through and beyond one side and has secured to its outer end a friction driving-wheel $b$.

F represents an annular rim having a flange $f$, which is secured to the vehicle-wheel F' concentric with its axis, and the casing A is held in such position that the wheel $b$ is always in engagement with and is consequently revolved by said flange. The face of the wheel $b$ is preferably semicircular in section, and the flange $f$ in contact therewith is preferably of similar form. The rim may be made of sheet-metal, and it is preferably secured to the spokes of the wheel by means of bolts $f'$, which pass through it and a corresponding ring $f^2$, which lies against the opposite side of said spokes, whereby when the bolts are tightened the spokes are clamped between the said ring $f^2$ and rim F. I prefer to form a second flange $f^3$ on the rim F, which flange lies between the friction-wheel $b$ and the axis of the vehicle-wheel F', and the two flanges $f$ and $f^3$ effectually protect the friction-wheel from mud and water.

A collar $c$ is fixed to the driving-shaft within the casing. A sliding sleeve C is mounted on the said shaft within the casing. To this sleeve and the collar $c$ are pivoted the outer ends of two pairs of levers D D', respectively, the inner ends of the levers D being pivoted to the inner ends of the levers D'. The ends of said levers pivoted together are enlarged, so as to form weights $d$ $d$. It is evident that as the shaft B revolves the centrifugal force will carry the weights away from the axis of rotation; and inasmuch as one end of each lever is pivoted to the fixed collar $c$, while the other end is pivoted to the sliding sleeve C, said sleeve will be moved along the shaft.

A bell-crank lever E is pivoted to the under side of the partition $a'$. On one arm $e$ of this lever is a friction-roller $e^2$, which enters an annular groove $c'$ in the sliding sleeve C. On the other arm $e'$ is a curved rack $e^3$, said rack being in the form of the arc of a circle, of which the pivot of the bell-crank lever is the center.

G represents a vertical shaft which is journaled in bearings in the partition $a'$ and in a second horizontal bar $a^3$ above the partition $a'$.

$g$ represents a spring-case which surrounds the shaft G and is held in proper relation thereto by the cross-bar $g'$, which is secured to said spring-case and through which the shaft G passes. The spring-case contains a spring $g^2$, of which one end is secured to the spring-case, while the other end is secured to the shaft G. On the outer edge of the spring-case are teeth $g^3$, with which a worm $h$ on a horizontal shaft H engages. This shaft is journaled in a bracket $h'$, which is secured to the partition $a'$ and in the side of the case A, through which it extends to a point where it may be operated for the purpose of turning the spring-case and thereby tightening or loosening the spring. On the upper end of the shaft G is the pointer I, which lies above a graduated dial $i$, which extends across the casing. On the lower end of the shaft G is a pinion $g^5$, with which the curved rack $e^3$ engages.

As the vehicle-wheel revolves the shaft B revolves. The centrifugal force of the weighted levers D D' draws the sleeve C along the shaft B. This rocks the bell-crank lever E. The curved rack turns the pinion $g^5$ and shaft G, and thereby the pointer I is carried around over the dial $i$, upon which are marked the figures to which the pointer points and thereby indicates the rate at which the vehicle is moving in miles per hour or any other terms selected. The spring $g^2$ resists the movement of the shaft G, which carries the pointer away from the zero-point, and consequently resists the movement of all the parts described, which must move to cause the shaft to move. The spring may be tightened or loosened by the shaft H and the worm $h$ and gear-teeth on the spring-case, and thereby the device may be adjusted to indicate the rate of travel of any vehicle, whatever be the diameter of the vehicle-wheel.

K K' K² K³ K⁴ represent a train of disks which are mounted upon a cross-bar L, which is secured within the upper compartment $a$ of the casing A to the sides thereof. These disks are the cyclometer-disks, and in the edge of each of the disks K' K² K³ K⁴ are the notches $k^5$, and secured to the disks K, K', K², and K³ are the fingers $k$, $k'$, $k^2$, and $k^3$, which are adapted to engage in said notches. These fingers are short, and the disks overlap each other, as shown, so that the fingers may engage in the notches. On the face of the disks K' K² K³ K⁴ are the numbers from "1" to "0" arranged at equal distances. On the face of the disk K are fractions—thus, "$\frac{1}{4}$," "$\frac{1}{2}$," "$\frac{3}{4}$," "-0"—arranged at equal distances.

As the fraction-disk K is near the end of one complete revolution the finger $k$ enters a notch in the disk K' and moves the disk one-tenth of a revolution. Each revolution of the units-disk K causes the next or tens-disk in like manner to turn once.

In the dial there are as many holes $i'$ as there are disks, and each hole is large enough to show one number at a time. These holes are so placed that each exposes to view a part of a different disk.

On the under side of the disk K and rigidly connected with it is a gear N, with which the pinion $m$ engages. This pinion is secured to a vertical shaft M, journaled in the partition $a'$, and a bracket $a^5$. A worm-wheel $m'$ is secured to the lower part of this shaft. On the shaft B is a worm $b^5$, which engages with and slowly turns this worm-wheel and shaft, thereby moving the disk K and the other disks, as described. The number of teeth in the worm-wheel and pinion are proportioned to the size of the vehicle-wheel, the flange, and the driving-wheel $b$, so that the first disk K will revolve just once for every mile traveled.

Having described my invention, what I claim is—

1. In combination, a casing, a dial, a horizontal operating-shaft mounted in the casing and extending out beyond one side, a collar fixed to the shaft, a sliding sleeve with an annular groove mounted upon said shaft, a bell-crank lever pivoted within the casing and having on one arm a projection which enters the groove in said sleeve, a curved rack on the other arm, a pointer-shaft, a pointer, and a pinion secured thereto, the latter engaging with said curved rack, a spring-case surrounding the pointer-shaft, a spring secured at its ends to said shaft and spring-case, and mechanism for adjusting the position of the spring-case, substantially as and for the purpose specified.

2. In a speed-indicator, the combination of the pointer-shaft, a concentric spring-case, a spring secured at its ends to said shaft and spring-case respectively, with worm-teeth on said spring-case, and a worm engaging with said teeth, substantially as and for the purpose specified.

3. In combination, a casing, the transverse horizontal bars $a'$ $a^3$ and L, a horizontal operating-shaft journaled in said casing, a fixed collar secured to said shaft, a sliding sleeve having an annular groove mounted upon said shaft, a vertical pointer-shaft journaled in the bars $a'$ $a^3$, a spring-case having the cross-bar $g'$ through which the pointer-shaft passes, a spring within the spring-case and secured at its ends to the pointer-shaft and spring-case respectively, a bell-crank lever pivoted to the bar $a'$, having a projection on one arm which enters the groove in the sliding sleeve, and having a curved rack on the other arm, a pinion on the pointer-shaft with which the curved rack engages, a train of cyclometer-disks mounted on the bar L, a worm on the operating-shaft and mechanism communicating motion from said worm to the first disk in the train, a flanged rim secured to the vehicle-wheel, and a friction-wheel on the driving-wheel engaging with the flange on said rim, substantially as and for the purpose specified.

In testimony whereof I affix my signature in presence of two witnesses.

HARRY H. KELLEY.

Witnesses:
CHARLES J. CREHORE,
ROSS FAUVER.